ORE PRETREATMENT

ORE REDUCTION

INVENTOR.
RICHARD J. BROOKS
CYRUS W. RICHARDSON
BY Reynolds, Beach + Christensen
ATTORNEYS

RESIDUE TREATMENT

INVENTOR.
RICHARD J. BROOKS
CYRUS W. RICHARDSON
BY
Reynolds, Beach + Christensen
ATTORNEYS

United States Patent Office 2,756,139
Patented July 24, 1956

2,756,139

TIN RECOVERY FROM TIN-TUNGSTEN ORE

Richard J. Brooks and Cyrus W. Richardson, Seattle, Wash., assignors to General Refining and Chemical Corporation, Seattle, Wash., a corporation of Washington Application January 2, 1952, Serial No. 264,462

12 Claims. (Cl. 75—85)

Tin ore from the Lost River district of Alaska contains both tin and tungsten, the latter in excess of 10% in the usual concentrate. Such ore or concentrate (hereinafter for convenience termed simply "ore") is not commercially smeltable by the usual process, used for cassiterite (tin ore, stannic oxide, $SnO_2$), of carbon reduction at high temperature, say 1300° C. If this process is employed with the tin-tungsten ore of this nature, not only is the cassiterite reduced, but the tungsten ores that are almost inseparably mixed with the cassiterite, namely scheelite (tungsten ore, calcium tungstate) and wolframite (tungsten ore, iron-manganese tungstate), are reduced to metallic tungsten, which deposits on the smelter grates, and requires seasonal shut-down of the smelter to remove the tungsten. This causes loss of the tungsten, of an appreciable percentage of the tin content, or the necessity of rerunning the slag, and the expense associated with such a shut-down and cleaning. As a result, such smelters assess a penalty for all ore within the tungsten content exceeds 5%, and refuse to accept those containing in excess of 10% of tungsten. Lost River ores are not acceptable without preliminary separation of the tungsten ore from the tin ore.

The only commercial plant in this country for such separation is located in New York, whereas the tin smelter usually employed is located in Texas. This required the shipment of the ore from Alaska to New York, and then to Texas, involving a considerable expense, in addition to the losses involved in the separation, and in the tin smelting. The separation procedure is primarily mechanical, being dependent upon the differences in specific gravity and other physical properties as between the wolframite and the cassiterite; when this is complicated, as it is in ores from the district mentioned, by the presence of scheelite so intermixed with the other compounds, wolframite and cassiterite, that their separation is difficult and incomplete, such mechanical processes will not effect any sharply defined separation, and a not inconsiderable amount of tin ore carries over into the tungsten ores, and is lost in the subsequent smelting of the tungsten. Also, there still remains a higher percentage than is desirable of tungsten present in the tin ore, and it, too, is lost in the smelting of the tin.

Other separation procedures, such as chemical pretreatment to dissolve the tin, and other smelting processes, have been attempted, but each introduces further complications, and none have heretofore been found practicable. We have, however, devised an integrated process whereby substantially 100% of the tin present in the ore can be recovered in metallic form, and substantially all the tungsten can be separated readily in the form of tungstic oxide ($WO_3$) and unreacted tungsten minerals, whence it can be reduced by a known process. Recovery of each metal may therefore be virtually complete, the smelting of the tin can be completed in one integrated operation, the cost whereof is materially less than the cost of the multiple operations and transportation heretofore involved, and the apparatus required is, in most details, conventional, although in certain details it is peculiarly suited to the present process, and is in its assembly and operation, novel and simple.

The present invention is considered to reside in the integrated process of treating this particular type of ore (containing tin and a high percentage of tungsten, and hereinafter referred to as "ore of the character described") for the purpose of recovering all the metallic tin, and of separating therefrom all the tungsten in a form whence it, too, is readily recoverable. The continuous segregation of a large part of the metallic tin by smelting under conditions unfavorable to the reduction of tungsten, or to the conversion of the tungsten into compounds which are difficult to handle, and the reduction of the tin content in the residue to a form and to a total quantity which, although high enough to make its recovery commercially desirable, is low enough to make chemical segregation of the tungsten and tin therein commercially practicable, and the recovery of this tin residue, so segregated, by recycling, also form part of this invention. The invention resides, additionally, in certain apparatus of a design and assembly especially for use in that process and to such ends.

Those novel features which characterize this invention will be disclosed in detail hereinafter, and defined in the claims which are a part hereof. This disclosure is to be taken as explanatory and illustrative, rather than as restrictive, except as is required by the terms of the claims, read in the light of this specification.

In the accompanying drawings a typical flow chart of the process has been shown, in simplified form and also in detail, and the reduction kiln and novel structural details thereof have likewise been illustrated diagrammatically.

Figure 1:
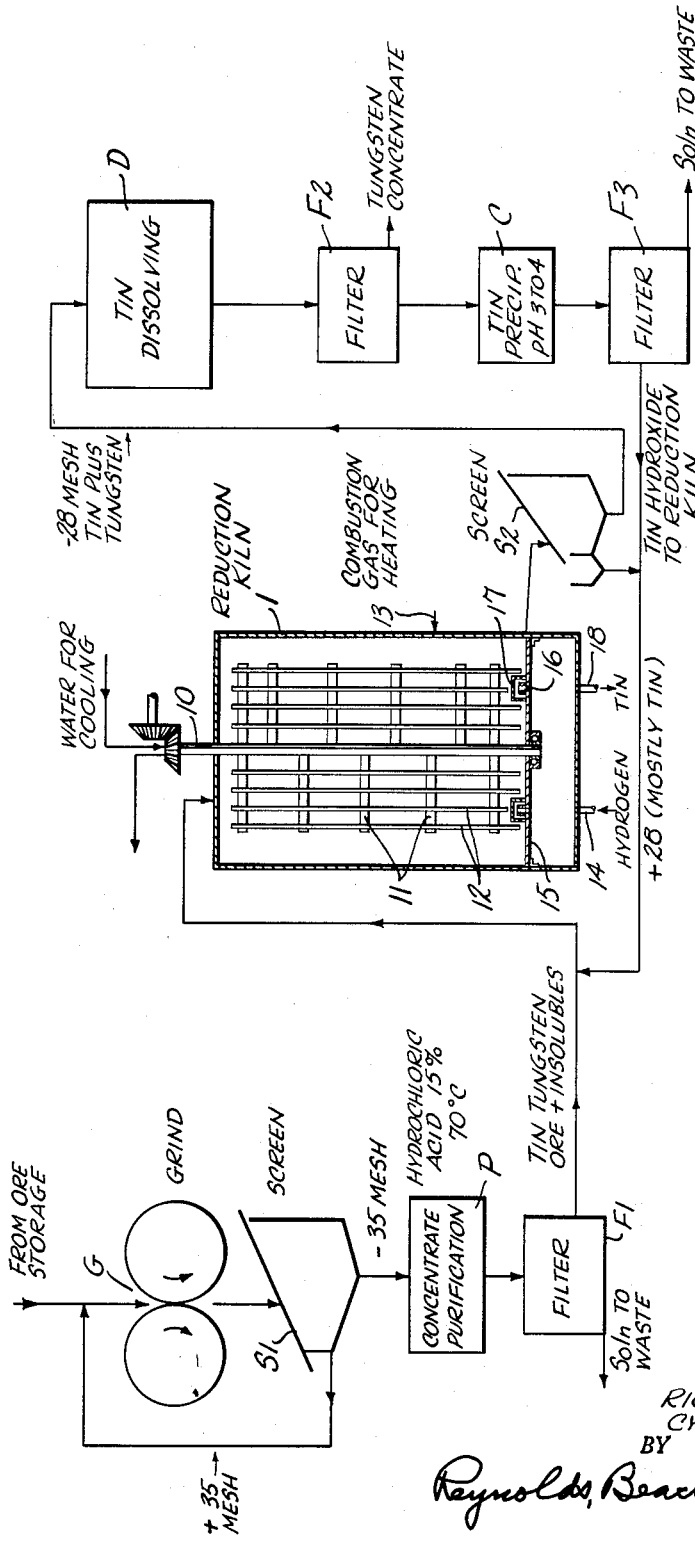
Figure 1 is a simplified flow chart of the integrated process.

As a briefly stated guide to the understanding of this invention, the process is, in general, a gas (hydrogen) reduction process, whereby after a pretreatment phase employed for the dual purposes (a) of obtaining a proper range of particle size, and (b) of eliminating as much as is feasible of the impurities (iron, lead, arsenic, etc.) and of accompanying limestone from the tin-tungsten ore, the tin is reduced to molten metallic form in a reduction kiln at a temperature appreciably lower (say at an optimum 750° C.) than in usual prior tin smelting operations, whereby reduction of the tungsten ore is avoided, and by virtue of continuous rabbling, especially with particles of the chosen sizes, and of other measures to be described, the tin ore is afforded thorough contact with the reducing gas, and molten tin is enabled to drain continuously from the mass of ore within which it is released, for agglomeration and collection; the residue, still containing appreciable quantities of undrained metallic tin (too much to waste, if at all recoverable economically), and some tin in combined form, plus the original tungsten content, unreduced, is chemically treated, with particular attention to the concentration of the acid reagent employed, to the dual end of (a) dissolving and leaching out all the metallic tin and (b) preventing conversion of the tungsten to a non-filterable form, whereby complete separation of tin and tungsten can be achieved by filtration. Thereafter the tin can be reprecipitated in a non-soluble form, and in known ways converted to the metallic form, as by returning it to the reduction kiln, thus to complete virtually 100% recovery; the tungsten content can be separately dealt with, to recover that metal. Thus, so far as concerns the recovery of tin from ore of the character described, the process involves two (or with the pretreatment phase of Figure 2 included, three) integrated and coordinated phases, the ore reduction phase shown in detail in Figure 3, and the residue treatment phase shown in detail in Figure 4.

It must be emphasized at this point that the residue treatment phase (using tin-tungsten ores as the starting point) hereinafter described is wholly useless with such ores unless and until the ore has first been reduced according to the particular ore reduction phase of this invention, to reduce all the tin concentrate to metallic tin. Leaching of tin ore is virtually impossible. Mantell, in his standard work on Tin (2nd edition, at page 158), states unqualifiedly "Cassiterite is one of the most insoluble compounds known." Further, on page 160, using such chemicals as are available in commercial quantities and at reasonable prices, for leaching tin ores, Mantell reports:

"In no case was there marked solubility in a commercial sense. In practically all cases the solubility of the concentrates was the same, irrespective of their previous treatment. It did not make any difference in the solubility whether the concentrates were treated as received, or after roasting, or after fine grinding and screening."

Conversely, and again for emphasis, the reduction of all the tin content of the ore to metallic tin in the initial ore reduction phase is not in itself the whole secret of proper and commercially feasible separation of the tin from the tungsten. While such total reduction of the tin is only possible with a kiln and process step which thoroughly and continuously rabbles the ore, in order to effect intimate access of the reducing atmosphere and temperature to all particles of the ore and to afford drainage channels for agglomeration and drainage of the molten metallic tin, and its collection at the bottom of the kiln. No such agglomeration and collection can be 100% effective, and some minimal quantity of residual metallic tin will be retained, as by capillary attraction, within the ore mass. Enough is so retained that an appreciable economic loss would result from discarding it, and its presence would impede recovery of the tungsten. If this residual tin were still in combined form—that is, if it had not been reduced to metallic tin by the ore reduction phase of the process—it could not be removed by a simple leaching process, and it would then be necessary to find a practicable way of removing it, or it would have to be separated and discarded. The necessity of so doing is avoided because of the fact that, being in metallic form, it can be removed by a simple leaching process.

Even the form of the kiln is peculiarly suited to the accomplishment of the end in view, the separation of tin from tin-tungsten ore. The tungsten ore is, in part, of greater specific gravity than the molten tin, and so sinks to the bottom of a pool of the tin. Tin ore alone would be of less specific gravity than the molten tin, and would float thereon and permit simple drainage of the molten tin. Drainage is not thus possible where tungsten ore sinks to the bottom of the molten tin, and so the removal of the tin by passing it through traps, as is more fully explained hereinafter, and the continuous rabbling to keep the sinking tungsten ore from clogging the outlets, is necessary for the successful operation of this two-stage process. Indeed, the rabbling is of prime importance in order to cause the reducing gas, and the prevailing temperatures to permeate the mass of ore continuously and repeatedly, and at the same time to open channels through the mass for the agglomeration and maximum drainage of the molten tin which is the essential first stage of the integrated process.

To sum up, then, without the first ore reduction stage the second leaching or residue treatment stage is unworkable; the ore reduction stage cannot be performed satisfactorily except by a kiln of the type described; and the ore reduction stage is commercially impracticable unless the residue of metallic tin—perhaps 10% of the tin content of the ore—is recovered cheaply from the reduction residue, whence it is not otherwise recoverable, by the residue treatment or leaching stage to be described.

There are certain problems present in the reduction of tin ore by known processes, when the iron content of the ore is high, and where the avoidance of formation of tin-iron alloy (hardhead) is a primary problem. The patent to Hayward and Wright, No. 2,547,939 of April 10, 1951, deals with such problems. These problems are of little moment in the process of this invention, whether the iron content of the ore be high or low, and regardless of similarity in the range of temperatures used. This temperature range is sufficient to reduce some at least of the iron content of the ore, but by other conditions present in the process of this invention, such as continuous rabbling and constant discharge of reduced molten tin by drainage, alloying of the reduced but (at this temperature range) not molten iron with the tin is largely precluded. Rather, the problems dealt with in this invention arise from the presence of excessively high quantities of tungsten in the ore. The problems here dealt with are solved, first, by correct choice of temperature in the gaseous reduction phase, to smelt the tin but not the tungsten; second, by thorough and continuous rabbling, in conjunction with choice of a predominant particle size for the ore particles, during reduction and rabbling such as will enable the hot reducing gas to permeate the entire ore mass, and will permit a large part of the molten tin to drain off continuously; third, by recognizing the impracticability of draining off all the tin, and the necessity of extracting (preferably chemically) the undrained tin, and any tin partially reduced, from the residue after reduction; fourth, by discovering that the tungsten compounds can only be precipitated from the solution containing also the tin (dissolved) from the residue, by maintaining a relatively high acid concentration during such tungsten precipitation, and by determining and maintaining the correct limits of such concentration; fifthly, by maintaining close control of the pH (and preferably also, of the temperature) of the filtrate during the reprecipitation of the tin therefrom, to avoid precipitation of residue iron without substantial loss of tin; and sixthly, by recharging the reprecipitated tin into the reduction kiln, so that in effect all the tin content of the ore is recovered at the one discharge point, and as part of a single, integrated process, even though some of the tin-bearing material is recycled after chemical treatment. Some of the above solutions are known per se, and not all need be employed in the practice of the present process according to the basic principles of this invention, but those principles, and the basically necessary procedures in combination, in the process, will be made clear hereinafter, and are of the essence of this invention.

Going somewhat more into detail, and without as yet attempting to emphasize the various problems involved and the particular nature of the solutions to those problems, Figure 1 discloses in simplified form a flow chart of the complete operation. In the preliminary phase the concentrated ore is delivered to grinding mechanism G, where desirably it is ground so that as high a percentage as possible will pass through a 35 mesh screen S1, and preferably none of it is ground finer than 200 mesh. That screened out in excess of 35 mesh (or 30 mesh at the coarsest) is returned for regrinding. It is of course impossible to avoid some fines smaller than 200 mesh, but the more nearly 100% of the particles approach, but do not exceed, 35 mesh in size, the more readily is the reduction and separation of the molten tin accomplished.

The minus 35 mesh concentrate is then subjected to a purification which has for its object the elimination of impurities such as iron, lead, arsenic, etc. and particularly limestone. That purification is indicated in general at P in Figure 1 and consists primarily of leaching with a 15% solution of hydrochloric acid at perhaps 70° C. Thereafter it is filtered at F1, the solution being drained and run off to waste, and the purified concentrate, primarily tin and tungsten ore with certain insoluble impurities, such as silica, is delivered to and charged within a reduction kiln 1.

It is the intention that that kiln 1, in its lower part at least, shall be filled to some appreciable depth with a bed of ore particles, and that these particles shall be agitated while being heated and subjected to a reducing atmosphere, to which end a water-cooled shaft 10, vertically disposed, is rotative within the kiln 1, is provided with radial arms 11, and these in turn support vertical bars 12. The result is that the mass of ore is rather thoroughly agitated and divided repeatedly, and interstices and channels are formed which admit heat and the reducing atmosphere to the interior of the mass, and serve also as channels for the constant drainage of molten tin. Without such agitation, or if it should cease, no tin will drain from the mass, hence continuous agitation is essential to the practical separation of the tin.

The heating may be accomplished in several ways, separately or in conjunction. For example, to the dry hydrogen gas which is admitted to and forced through the ore bed within the kiln may be added oxygen in quantity insufficient for complete combination. It should be added, with proper safeguards, only after the temperature is well above the ignition point, say at 725° C. Hydrogen may be burned exteriorly of the kiln and admitted thereto, as by the inlet at 13. Heating might be, but preferably is not, wholly by external burners. In any event, heated hydrogen gas for reduction of the ore is admitted at 14, beneath the false bottom 15 of the kiln, passing upwardly into the main chamber of the kiln above the false bottom 15, by means of nipples 16 projecting upwardly within tin traps 17 (see Figures 5 and 6). It may burn if and when some oxygen is admitted to the interior of the kiln, contributing thereby to heating the ore. The temperature is maintained preferably in the vicinity of 750° C. The temperature may rise as high as 850° C. or may be somewhat lower than 750°, as will appear in greater detail hereinafter, but it has been found that, other things being equal, the greatest efficiency of separation, and separation of the metallic tin in the shortest space of time from this type of ore, can be accomplished by maintaining the temperature in the vicinity of 750°. At temperatures above, say, 800° to 850° the tungsten begins to decompose to yellow tungstic oxide, $WO_3$, and the mixture begins to sinter into a hard mass which will not flow readily from the kiln. Such higher temperatures should be avoided, while still maintaining a sufficiently high temperature to smelt the tin.

The tin traps constitute the exits for the molten tin from the kiln chamber, whence it passes out by way of the tin discharge port at 18, and is run off into pigs.

Since the tin traps constitute the exits for the molten tin, and prompt and constant discharge of the tin is of great importance to the success of this process, it is extremely desirable that all these tin traps, which are distributed over the false bottom 15 at as close intervals as is feasible, be kept clear of accumulations of the ore itself, so that the molten tin mechanically released from the ore mass by the rabbling and by the ingress of hydrogen may run down and out continuously through the traps. This is another reason why the vertical bars 12 are used, and why they extend downwardly substantially to the false bottom 15, and closely in the vicinity of the several traps 17.

The inflow of hydrogen gas at the tin traps 17 has been found to be of extreme importance in maintaining steady outflow of the molten tin. If the hydrogen inflow slacks off, ore more dense than the tin collects around a trap, and soon this trap is closed off and ceases to function in either direction; reducing hydrogen can no longer enter there, nor can molten tin exit there. So long as the hydrogen can flow in freely at a trap, the molten tin collects and exits there, and clogging does not take place.

Still referring to Figure 1, the residue, cooled below the melting point of tin in a reducing atmosphere, contains an appreciable quantity of tin, mostly in free form, which it has been mechanically impossible to separate from the mass of ore, but a small amount still in combined form. The ore also contains now a high percentage of tungsten in combined form, for none has been smelted out. Accordingly, after discharge from the kiln, it is screened, and all plus 28 mesh agglomerated particles, which are mostly tin in metallic form, are screened out at S2 and returned to the kiln for recycling. The smaller particles are advanced to the final or residue-treatment stage, where they are treated to separate the tin residue from the tungsten. It is practical now to use a known chemical treatment but modified in detail, to dissolve the tin, for the tin content is now low, though still high enough to make its loss undesirable, and the cost is therefore not excessive. Nevertheless, the presence of the tungsten complicates the ultimate separation of the tin and the tungsten, and requires some modification of the known process, and in particular, careful regulation of the acid concentration.

Still following Figure 1, the first step at D is to dissolve the interstitial metallic tin, to which end sulfuric or hydrochloric acid is employed (these two acids producing soluble tin compounds from metallic tin, notwithstanding that they will not dissolve cassiterite), but, as will be brought out more fully hereinafter, the concentration of the acid solution must be maintained carefully within limits hereinafter specified in order to obtain consistently good results. Likewise, to speed up the solution, a sodium nitrate solution is employed additionally.

By this treatment, leaching with the acid solution places the tin content of the residue in solution, and if the acid concentration of the solution at D has been carefully controlled, in a manner explained in detail hereinafter, those tungsten compounds in the residue which might otherwise be converted into a non-filterable precipitate—the scheelite, primarily—will have been converted instead into a filterable tungsten precipitate, while the wolframite will not be materially attacked by the acid, and is itself filterable. Unless the acid concentration is thus carefully controlled, some at least of the tungsten compounds will be converted to a virtually nonfilterable precipitate, which can not be separated from the dissolved tin, and the discovery of how this can be avoided and separation effected at this point is one of the novel features of the present invention.

Having then placed the tin in solution and produced the filterable tungsten precipitate, the two can be separated by filtration at F2, and the tungsten precipitate can be discharged for subsequent treatment or reduction to metallic tungsten. The dissolved tin being expressed at F2 may again be treated as at C to convert it to an insoluble form, and here again the maintenance of the pH of the solution within a selected range is important, as is also the neutralizer used and the temperature during neutralization. Having converted the tin to a filterable form, it can be filtered out at F3, the solution discharged to waste, and the precipitate can be returned for charging into the reduction kiln 1, wherein it is converted to the metallic form.

Thus it can be seen that because the tin is first reduced to metallic form, and most of it can be drained off, the small residue can be leached practicably, and so virtually all is recoverable in the single integrated process; that the tungsten is effectively separated therefrom, that virtually all the tungsten is recoverable, and that the cost can be kept well within commercially acceptable bounds.

Figure 2:
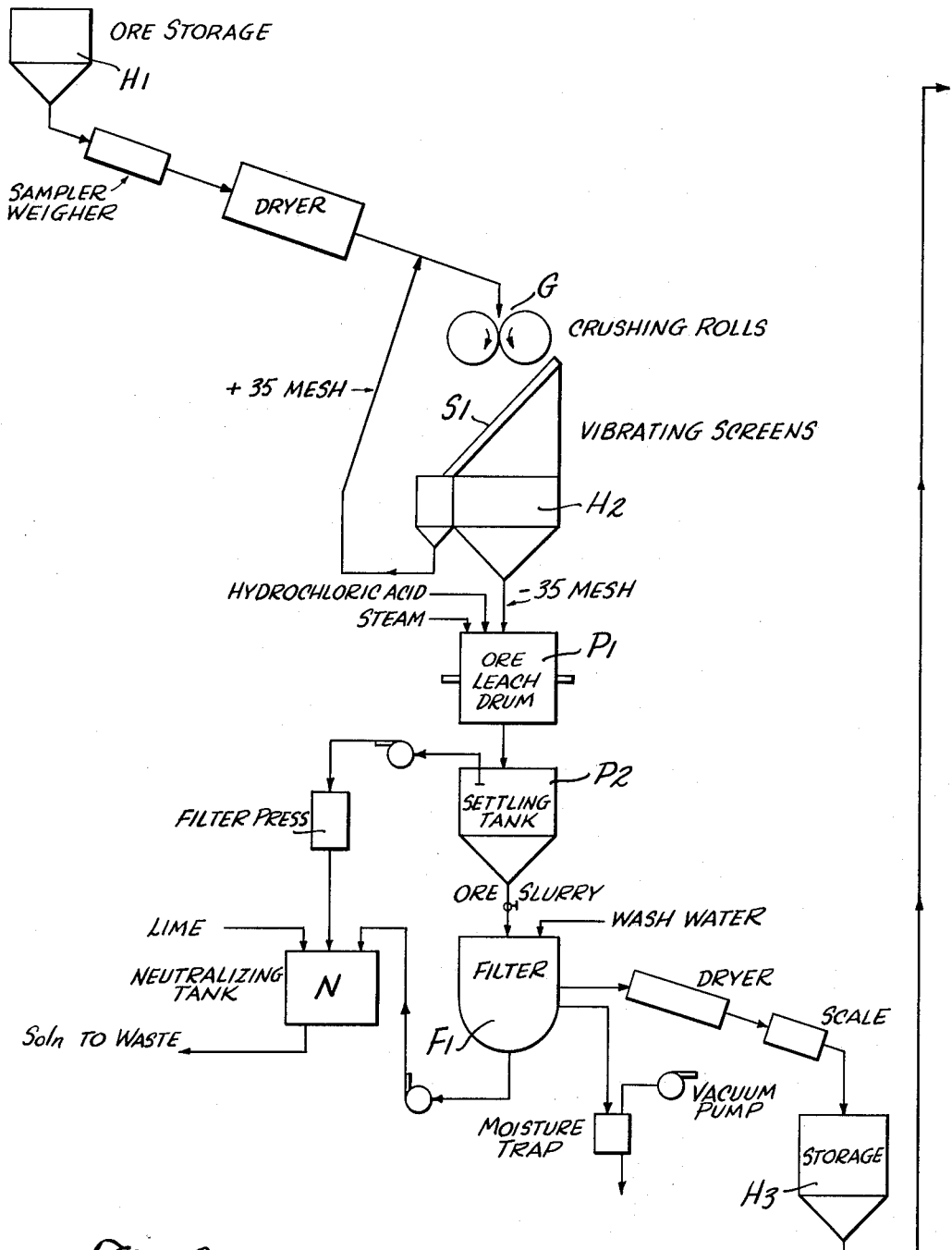
Figure 2 is a flow chart of the ore pretreatment phase of the process.
Figure 3:
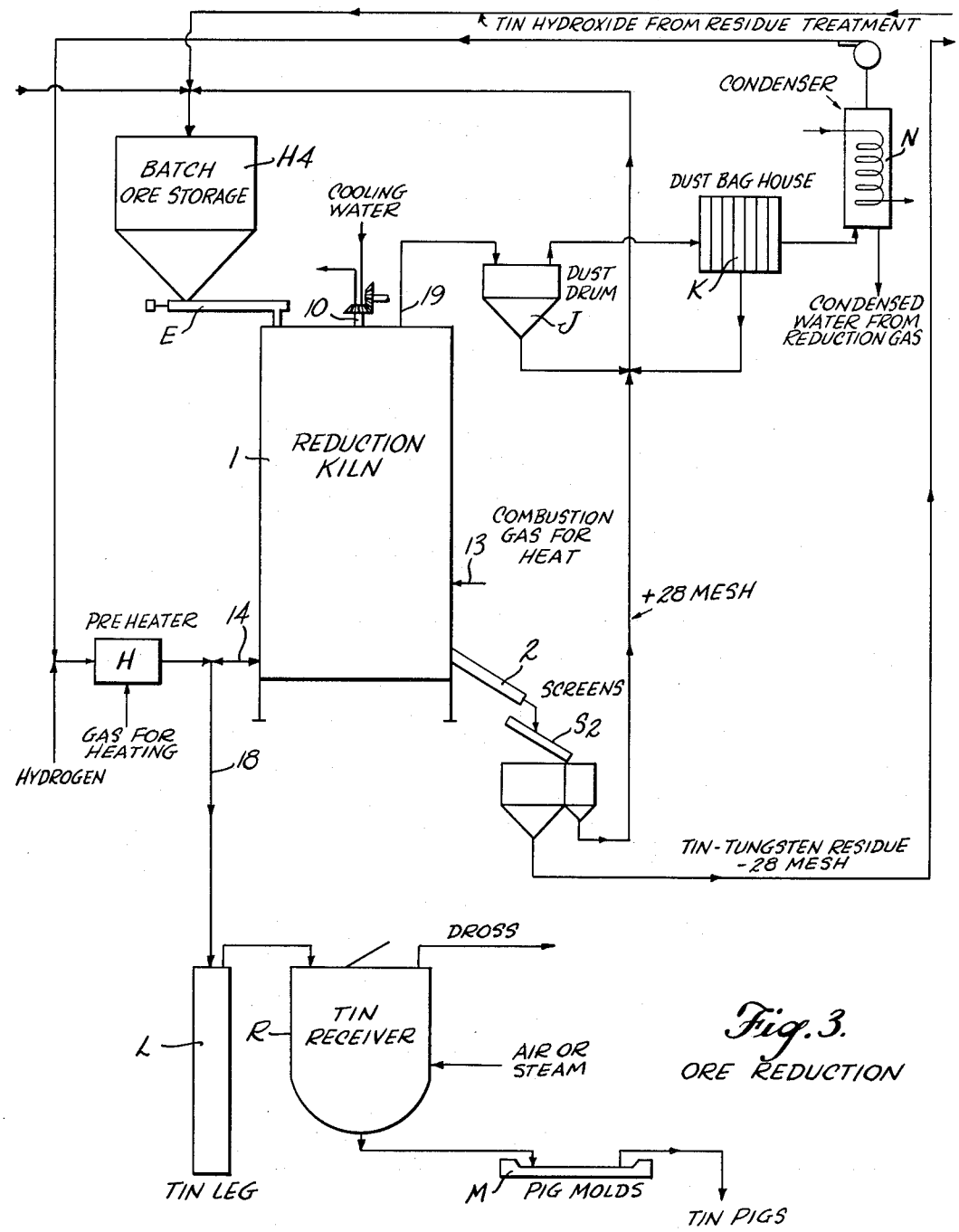
Figure 3 is a continuing flow chart of the ore reduction phase.

Figure 2 illustrates in greater detail the ore pretreatment phase. The ore concentrate is stored in a hopper H1 and after sampling, weighing, and drying, it is ground at G, and screened at S1, and the minus 35 mesh particles are received in the hopper H2, the larger particles being screened off and returned for regrinding. From H2 these minus 35 mesh particles are charged into an ore leaching drum P1, where they are treated preferably with hydrochloric acid and steam, or any other necessary reagents, to remove and preferably to dissolve the limestone, and to remove some of the iron, lead, arsenic, etc. It is particularly desirable that the limstone be completely removed at this point, as otherwise it causes very heavy and persistent frothing in the residue treatment phase, which frothing, as will be explained, can be reduced appreciably but which is better prevented by the preliminary removal of the limestone. The hydrochloric acid has no effect on the tin ore, merely on the impurities. The leached ore is delivered into the settling tank P2. The liquid is decanted off, neutralized at N, and disposed of, and the thick ore slurry from the settling tank P2 is delivered to the filter F1, washed, and the solids delivered by way of the dryer and scale to the storage hopper H3. That hopper H3 may be located adjacent the charging point of the reduction kiln, or a separate hopper H4, as shown in Figure 3, may be so located. This hopper contains the tin-tungsten concentrate purified by the pretreatment phase, and ready for reduction. It contains also tin-bearing products of later stages, for rerunning, as will appear more fully hereinafter.

Some positive gas pressure will exist within the reduction kiln 1, wherefore means should be provided, such as the conveyor E, to prevent loss of pressure and blowing out at this point, where the ore reduction phase commences.

Hydrogen gas, preferably, which has been dried and heated at H, is admitted from any suitable source to the interior of the kiln at 14, and usually also at 13, as has already been explained. Details of the kiln have already been touched on and will be explained more fully hereinafter. The reducing hydrogen passes through the risers or nipples at 16 and upwardly through the charge within the kiln as the charge is agitated by the arms 11 and the vertical bars 12, the hydrogen eventually passing off at 19.

In working on this invention a great many attempts were made to produce effective smelting of the tin with no rabbling, or a minimum thereof, with ore ground to various particle sizes, and at various temperatures and with various gases. It was found that in the absence of thorough, effective, and continuous rabbling, the quantity of tin recovered from the mass was not large. In addition, the time required for complete reduction is increased greatly. However, there is another factor of very great importance to attaining a high percentage of recovery in a minimum time; this concerns the size of the particles. If all the particles could be of 35 mesh size, and they could be thoroughly rabbled, tin recovery conditions would be ideal. To the extent that the particles are of smaller size, even though the mass is rabbled thoroughly, recovery is lower. Rabbling affords channels through the mass for drainage of the molten tin, but the higher the percentage of fines, the more readily do these channels become clogged, the hydrogen cannot penetrate the ore mass, and the tin cannot run out. Employment of the correct temperature range, alone, will not effect the desired results. Both thorough rabbling and choice of the correct particle size, in the highest degree possible, seem necessary, in conjunction with the correct temperature.

As has been stated above, such tin as melts and collects at the bottom of the kiln can only be recovered if it is promptly discharged, and its discharge can occur only if the hydrogen admitted to the interior of the kiln from the inlet at 14 is caused to bubble continuously through the pools of molten tin, which collect in the vicinity of the traps 17. In the absence of such continuous upward discharge of hydrogen and consequent continuous discharge of tin, the tin is likely to alloy with iron to form hardhead on longer contact with the iron-containing concentrates. Rabbling, particularly with the use of the lower ends of the vertical bars 12 closely in the vicinity of the tin traps, serves to keep the ore mass broken up, and to facilitate the formation of channels through which the molten tin can drain out from the mass. It is, therefore, highly important to the success of the process that the rabbling be accomplished in as thorough manner as possible—that it be particularly effective and constant in the vicinity of the traps, and that the discharge of hydrogen through the pools of molten tin trapped in and around the tin traps be continuous, and through each and all the traps.

As to temperature, since tin in molten form is reduced from its ores at a low temperature, especially in comparison to the materially higher temperatures required to smelt the other metals that may be present in the ore, there is no lower limit other than one which is adequate and which produces the tin at a sufficiently rapid rate. A temperature of 650° C. is about as low as is practicable, consistent with sufficiently rapid production of molten tin, when smelting the ore dealt with herein. With other ores a lower temperature might prove practicable. There is, however, an upper limit, say 850° C. or thereabout, which should not be exceeded with any ore that contains tungsten, for reasons already explained. Using the optimum temperature of about 750° C. rapid reduction occurs, but no appreciable tungsten decomposition nor slagging occurs.

The molten tin, leaving the reduction kiln 1 continuously by the exit at 18, is run into a heated tin leg L where it is kept in molten state for the purpose of constituting a gas trap against the pressure within the kiln 1, and then is run into a tin receiver R. Air or steam is admitted thereto to oxidize remaining impurities, which are removed as dross, these being principally arsenic. The impurities are more readily and quickly oxidized than the tin, and the tin is left of a commercial grade of purity, and is run from the receiver R into pig molds M.

The gas which is discharged from the kiln 1 at 19 carries some burden of dust from the fines. Obviously the smaller the percentage of fines, the less dust there will be. This dust is passed through a dust drum or separator at J and through a dust bag house at K, whereby the dust is separated from the gas; the gas is passed through a condenser at N, where its burden of water from the combustion of hydrogen and reduction of the oxides is condensed and eliminated, and the nearly dry hydrogen gas may be returned to the heater at H for mixture with make-up gas, and reuse.

After completion, as far as is practicable, of the reduction of the tin content of the ore in the kiln 1, the ore is discharged at 2, is screened at S2 to segregate the plus 28 mesh particles, which are mostly agglomerated tin, from the minus 28 particles. The plus 28 mesh particles are returned to the storage hopper at H4 for recycling through the kiln, as is the dust recovered at J and K; and the minus 28 mesh particles are advanced to the residue-treatment phase.

The time required for reduction and evolvement of the tin in the phase just discussed will depend upon numerous factors, such as the percentage of fines in the ore, the depth of the bed of ore in the kiln, the prevailing temperature, the freedom, or lack thereof, of contact between the reducing gas and the ore particles, the clogging, or not, of tin traps, etc. It is not possible to specify the time precisely; it has required sometimes 24 to 48 hours, but it is known that satisfactory reduction and evolvement of tin can be accomplished in from 4 to 6 hours, in an improved kiln giving better physical contact between the reducing gas and the ore particles.

Figure 4:
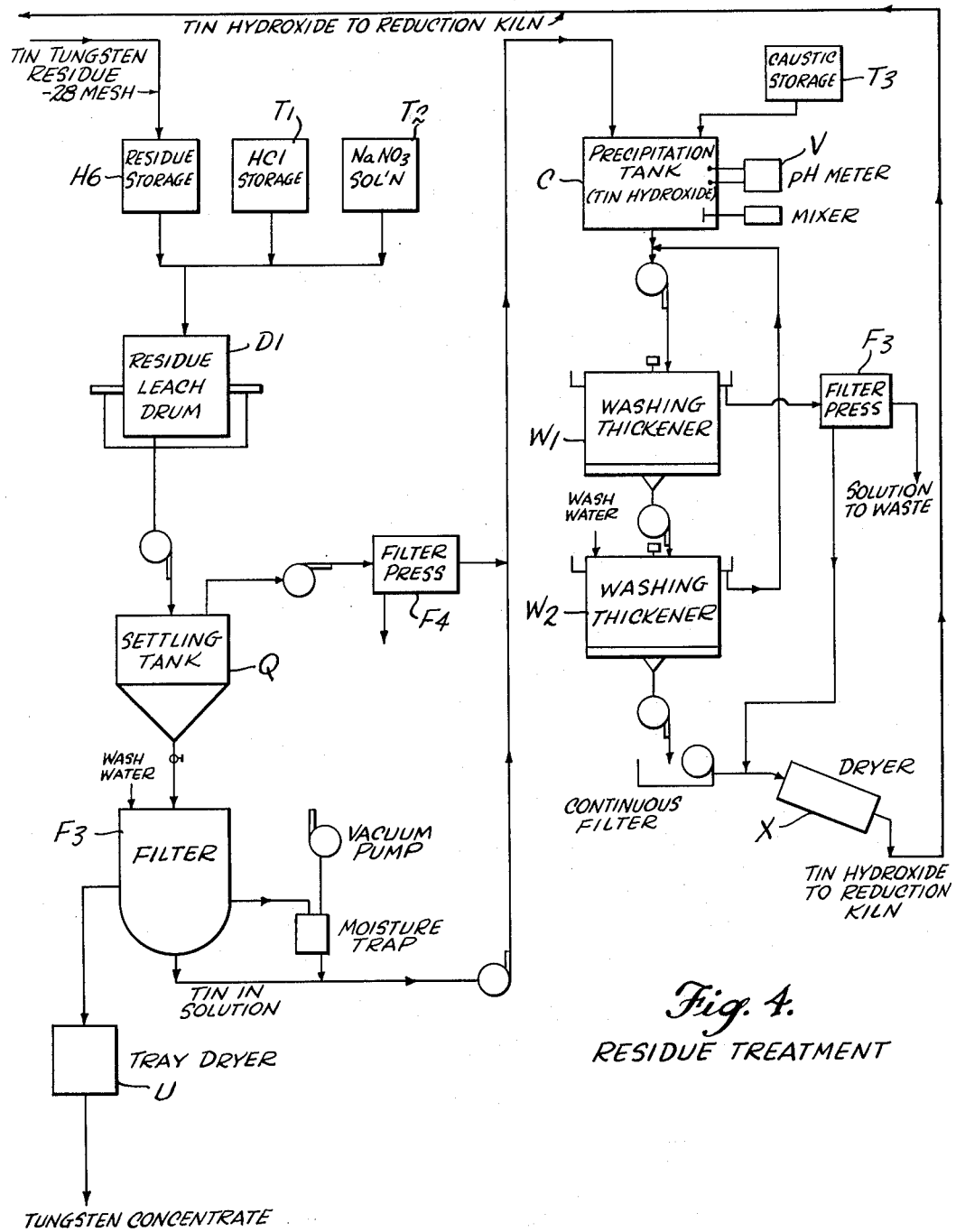
Figure 4 is a continuing flow chart of the residue treatment phase, the three combining to illustrate the details omitted from, and the complete process shown in Figure 1.

While the extraction of the tin from the residue may be accomplished in various ways, and is desirable, its tin content is now sufficiently small to make a chemical treatment practicable. The details of the residue-treatment phase, as preferably practiced, are illustrated in Figure 4. Control of certain chemical factors in this phase is of very considerable importance. The purpose to be achieved in this phase is the dissolving of the remaining tin, now less than 10% of the original tin content of the ore, which is readily accomplished by means and procedures modified somewhat from those which are generally known, and in addition thereto, the precipitation of the tungsten residue in a form which can be separated by a procedure such as filtration. It is the latter which furnished a problem which could be solved only by proper maintenance of the acid concentration in the leach solution by which the residue from the ore reduction phase is first treated. Also, the use of an elevated temperature helps greatly, and the presence of a suitable oxidizing agent is quite necessary.

The residue from the ore reduction phase, that is, the minus 28 mesh particles, are stored in the hopper H6, and thence are delivered into the leaching drum D1, and hydrochloric acid from the tank T1 is supplied also to the leaching drum D1, together preferably with sodium nitrate solution from the tank. It has been discovered that not only will sodium nitrate, or some other suitable oxidizing agent, hasten the rate at which the tin is dissolved, but it seems necessary in order to avoid formation of the practically unfilterable lower oxide of tungsten, $W_2O_5$, and to insure formation of the readily filterable higher oxide, $WO_3$. The actual dissolving of the tin is accomplished by the hydrochloric acid solution, although at this stage sulfuric acid may likewise be employed.

In the discussion of the pre-treatment phase the elimination of limestone was stressed; it was also mentioned that the undesirable result, frothing in the residue-treatment phase, could be neutralized to a reasonably satisfactory degree. It is much to be preferred that the limestone be eliminated substantially completely by the described chemical treatment in the pre-treatment phase, but should this be omitted, or incompletely accomplished, it has been found the heavy frothing resulting from the addition to limestone-containing ore of the acid solution at D1 can be minimized or broken down by the addition, at this point, of a small quantity of a wetting agent, such as aerosol. This does not affect any subsequent steps.

It has been found that the hydrochloric acid, though it will dissolve the metallic tin readily in conjunction with an oxidizing agent, such as sodium nitrate solution, at any reasonable concentration, nevertheless must be maintained at at least 2.5 N, usually in the range from 2.5 to 3.0 N, and unless it is maintained at least this strong, the tungsten is converted by the presence of metallic tin to tungsten oxide, $W_2O_5$, a finely divided and somewhat gelatinous blue precipitate. This residue is so fine that it is nonfilterable. Maintaining the acid concentration withn the range indicated above, however, keeps the residue readily filterable, and the washed residue contains less than 1% of tin. Referring to Figure 4, the leached residue is discharged to a settling tank Q, is filtered at F3, decanted liquid is drawn off and it, too, is filtered at F4, and the tungsten concentrate and tungstic oxide is drawn off and dried at U, where it is ready for further purification by any suitable process or to be sold as concentrates. That does not further concern this process.

The tin in the solution is drawn off from the filter F3 and likewise from the filter at F4, and is delivered to a precipitation tank C. There an alkali is added to it from the tank T3. This alkali solution may be sodium hydroxide (NaOH), or sodium carbonate ($Na_2CO_3$) but if the sodium carbonate is used, the ultimate precipitate is much easier to filter. Heating to 70° or above, during precipitation, materially speeds up the filtration step.

In this stage, whatever the alkali or neutralizer used, and whether or not the solution is heated, maintenance of the correct acidity or pH is quite important to the success of the procedure. A pH meter is indicated at V. It has been found that if the pH is maintained at this point within the range of 3.0 to 4.0, the tin will precipitate out virtually completely, but if the pH is permitted to approach 5.0, ferrous iron and other impurities begin to precipitate out as well, and the percentage of tin in the precipitate is materially decreased, and is contaminated with such impurities.

After treatment in the precipitating tank C within the correct pH range, the precipitate is washed at W1 and W2, the wash water being passed through a filter F3, and the solid residue is dried at X, and is then returned to the storage hopper H1 for recharging into the reduction kiln 1 for recycling, in the course of which it is reduced to the form of metallic tin.

Figure 5:
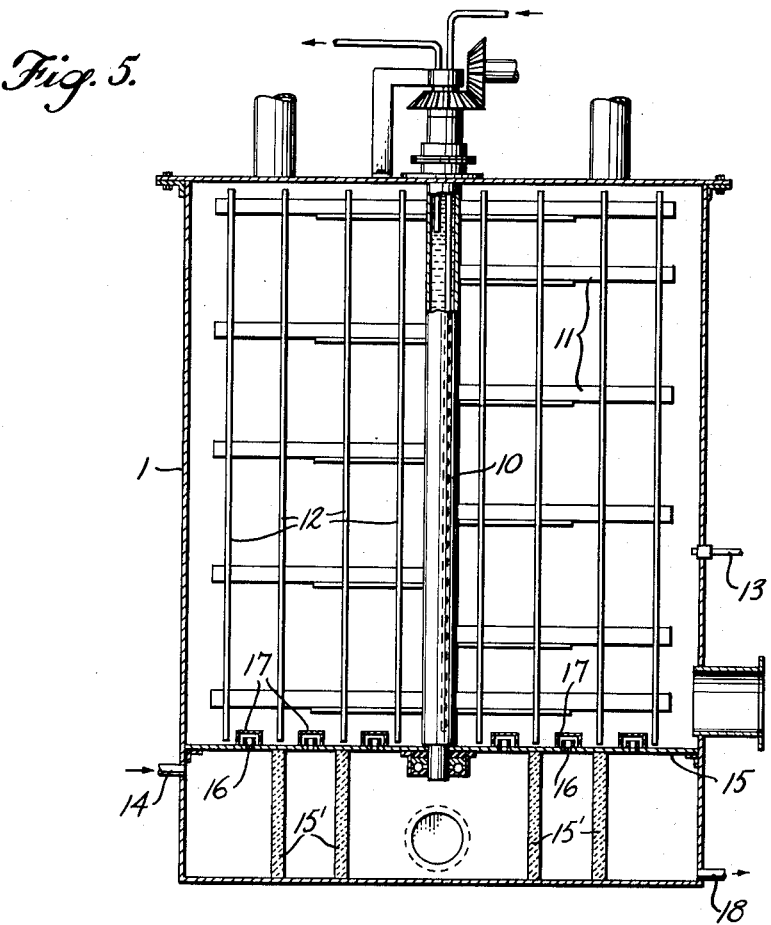
Figure 5 is an axial sectional view through the reduction kiln, diagrammatically illustrating certain details of its construction and the principles involved therein.
Figure 6:
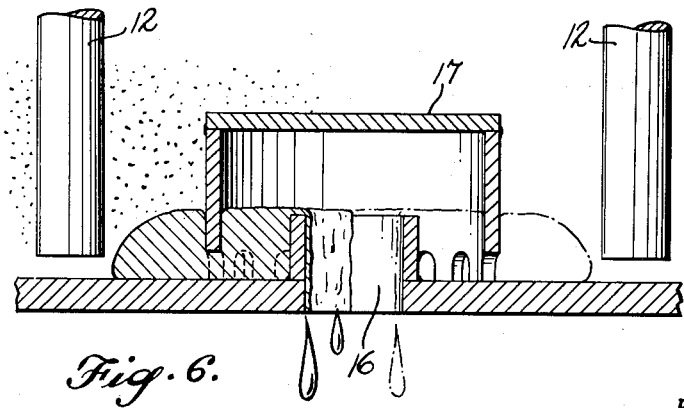
Figure 6 is a similar sectional view, enlarged, of a tin trap of the nature employed in the reduction kiln.

The details of a satisfactory reduction kiln and its tin traps are shown in Figures 5 and 6, respectively. It is to be emphasized, however, that these views, and particularly Figure 5, are only diagrammatic in nature, and are not intended to represent necessarily a commercial form of the kiln. These views do, however, represent the principle of the apparatus which is to be employed.

The rabble arms 11 radiating from and spaced along the water-cooled rotative shaft 10, and the vertical bars 12, have already been described, and their purpose has been explained. The traps, consisting of the nipples 16 through and upstanding one-half inch above the false bottom 15 and the hoods 17, one and one-eighth inches high which cooperate therewith to trap the molten tin, and to force the incoming hydrogen to bubble through the tin and through ore surrounding the tin traps—these, too, have been described. Such features as a clean-out opening near the bottom, a charging opening at the top, suitable bearings and a gas seal for the shaft, and means to rotate the shaft, would be necessary, and any conventional or suitable construction would be employed. The rate of rotation of the shaft need not be rapid, 1½ or 1⅓ R. P. M. has been found adequate, in a kiln chamber somewhat over five feet in height and 45½ inches inside diameter, to rotate five radial arms 11 on each side of the shaft, staggered with relation to those on the other side (except at the bottom), and supporting eight vertical bars 12 in all. The dimensions given, and other details, are to be understood as illustrative rather than restrictive.

The shell of the kiln, and the arms 11 and bars 12, should be of non-corrosive material, and strong enough to resist deformation at the temperatures and under the stresses encountered. The shell, in a typical installation, was ¼" stainless steel, type 347 stabilized with columbium, although any of the stabilized types, 316, 321, or 347, would have been suitable. Refractory posts 15' support the false bottom 15 against sagging. The tin traps are type 316 stainless steel, as were other auxiliary parts which came in contact with the ore or tin, for instance the radial arms 11 and the vertical bars 12. The shaft 10 was made of seamless mild steel tubing, but could be protected against corrosion at the kiln temperature by water-cooling it. Wherever possible the materials that come into contact with the ore should be refractory, and all moving parts should be cooled.

It is of particular importance to keep the traps 16, 17 clear at all times. Scraping means, as suggested by the lower ends of bars 12, should scrape as close as is feasible to the traps at all times, to insure that none is clogged. Clogging prevents entrance of hydrogen, and reduction in the vicinity of a clogged trap is interferred with. Likewise, escape of tin, which gathers in a pool around each trap, is prevented by a clogged trap. In addition, the greater localization of reaction around the remaining unclogged tin traps hastens their corrosion. Care must be taken to keep all tin traps clear by scraping and agitation during reduction. Indeed, it would be desirable to meter the gas admitted through each trap, in order to determine which and how many are not operating satisfactorily, and to provide means to clean out malfunctioning traps during operation.

The kiln may be heated exteriorly or interiorly, preferably the latter, as shown, or both. The hydrogen gas that has been used for reduction is of 99.6% purity, supplied at a pressure of 2.5 to 5.0 p. s. i. and passing 80 C. F. M. (with burners operating simultaneously at from 45 to 60 C. F. M.) through a 2½ foot bed of ore. The hydrogen was incompletely consumed, and was reused after extraction of the water and reheating at H. This heater may be a coil within the internally heated kiln.

With ore of the character described, treated under the conditions explained, in a plant having a capacity of some five thousand pounds of ore, it has been found possible to recover in the vicinity of 99% of the tin present, and the loss of tungsten, too, was less than 1%. With further detail improvements, better design, and longer experience it is expected that these losses will be reduced further, and become wholly negligible. The hydrogen efficiency, although not high when the gas is not recycled, is materially improved by recycling. Efficiency depends to a high degree on the freedom with which the reducing gas has access to all particles, the heating of the ore to uniform temperature throughout, and as a result, on the freedom and continuity with which the tin can drain through and out from the bed of ore. Drainage is a factor dependent on continuity of rabbling, and to a degree, on the correct particle size, not too large to impede thorough heating and reduction of the tin, nor too small to clog the gas access and drainage channels between particles, and as formed by the agitator. Of course, having extracted and collected the tin, efficiency will still be poor unless it can be drained readily through and from the traps. Finally, efficiency of recovery depends, on the one hand, on the sharpness of separation between the tin and the tungsten in the residue treatment phase, which relates back to the maintenance of the correct range of acid concentration, to avoid formation of colloidal and difficultly filterable $W_2O_5$, and on the other hand, on the sharpness of precipitation of the tin without precipitation of iron in particular, which is achieved by close regulation of the pH.

We claim as our invention:

1. A method of extracting tin from tin-tungsten ore of the character described, which includes the steps of heating the ore while subjecting it to a gaseous reducing medium, to a temperature insufficient to reduce the tungsten, but sufficient to reduce the tin content, in large measure, to molten, metallic form; extracting the molten tin promptly from the ore by continuous drainage, to leave a residue containing tin primarily in the form of undrained metallic tin, plus unreduced tungsten compounds; dissolving substantially all the metallic tin in said residue in one of hydrochloric or sulfuric acid while maintaining the concentration of such acid at least 2.5 N, to produce a filterable precipitate containing substantially all the tungsten compounds and a filtrate containing substantially all the tin; separating such precipitate and the filtrate; reprecipitating the tin compound from the filtrate; and extracting therefrom the metallic tin.

2. A method as and for the purpose expressed in claim 1, wherein the ore is collected in a mass of particles, during the reduction phase, and is continually agitated to open channels throughout the mass for access of reducing gas and for drainage of molten tin.

3. A method as and for the purpose expressed in claim 1, wherein the ore is preliminarily reduced to particles all as nearly as practicable in the vicinity of 35 mesh in size, and which includes the step of continuously agitating the resultant bed of ore during reduction, to afford channels penetrating the bed of ore, for drainage of molten tin and for access to the interior of the ore bed of the gaseous reducing medium.

4. A method as and for the purpose expressed in claim 1, wherein the ore is heated to a temperature in the vicinity of 750° C.

5. A method of extracting tin from tin-tungsten ore of the character described, which includes the steps of reducing tin oxide by heating the ore to a temperature above 650° C. but not substantially above 850° C., while subjecting it to a gaseous reducing medium, to extract a part of the tin present in molten form, and to leave a residue containing the remainder of the tin content in metallic form and substantially all the tungsten, thereafter dissolving substantially all the tin content of said residue in an acid while maintaining the concentration of such acid at least 2.5 N, to leave substantially all the tungsten in the form of a filterable precipitate of tungstic oxide and unreacted tungsten minerals, filtering out such precipitate, and thereafter converting the dissolved tin salt to metallic tin.

6. The method defined in claim 5, characterized in that, during the tin-dissolving step, an oxidizing agent is present to assist in converting the decomposed tungsten minerals to tungstic oxide.

7. The method of claim 6, wherein the oxidizing agent is sodium nitrate.

8. A method of separating, for subsequent recovery of one or both metals, each of the tin and the tungsten from ore which contains both cassiterite and one or both of wolframite and scheelite, which method includes the steps of reducing the ore to small granular form, charging a rabble kiln with a mass of such granules, subjecting the ore charge to a gaseous reducing medium, while heating it to a temperature above 650° C. but not over 850° C. and while continuously rabbling it to open channels through the ore mass for access of heat and the gaseous reducing medium and for continuous agglomeration and drainage of molten tin, draining off molten tin from the kiln while entrapping and holding back the denser and unreduced tungsten ore, leaching from the residue of the charge the reduced but undrained residue of the metallic tin, and filtering out substantially all the tin content in dissolved form, to leave the non-filterable remainder of the charge with substantially all of the tungsten content, and substantially one of the tin content.

9. A method as and for the purpose expressed in claim 8, wherein the leaching step is accomplished by subjecting the remainder of the charge to one of hydrochloric or sulfuric acid while maintaining the acid concentration at least 2.5 N, whereby to dissolve out substantially all the reduced tin content from such remainder, and to leave undissolved substantially all the tungsten content in the form of a filterable precipitate.

10. A method as and for the purpose expressed in claim 9, wherein during the leaching step an oxidizing agent is present, to assist in converting the tungsten content in part to insoluble and filterable tungstic oxide, the balance of the tungsten content remaining in the form of unreacted and filterable tungsten minerals.

11. A method of recovering each of tin and tungsten from a complex ore which contains, in combination, both such metals, and wherein the tungsten ore component is of a density approximating or exceeding the density of molten tin, which method includes charging a kiln with a mass of such ore in the form of small granules; injecting a hot reducing gas, at an effective temperature not exceeding substantially 850° C., into the bottom of the ore mass; continuously rabbling the charge to open access channels throughout the charge for the hot gas and at the same time drainage channels for continuous agglomeration and drainage of the molten tin countercurrently to upward flow of the hot gas through the same, the hot gas in its passage through the molten tin pushing back any denser, unreduced tungsten ore which might otherwise clog the drainage channels; draining off thus the majority of the molten tin, and leaving the tungsten ore unreduced and admixed as a residue with a minor portion of undrained molten tin; cooling the residue; leaching the residue with an acid, while maintaining the acid concentration at not less than 2.5 N, to dissolve the tin component of the residue, and to leave the tungsten in a readily filterable form; and separating by filtration the solution containing substantially all the tin, and the solid remainder containing substantially all the tungsten.

12. The method as and for the purpose defined in claim 11, including the further steps of adding a basic carbonate, while maintaining the tin-bearing solution at a temperature not less than 70° C., to lower the acid concentration of the solution to a pH not greater than 4.0 and not materially lower than 3.0, to precipitate the tin as a readily filterable solid; and filtering out the precipitate.

References Cited in the file of this patent

UNITED STATES PATENTS

| | | |
|---|---|---|
| 859,184 | Brandenburg | July 2, 1907 |
| 1,149,495 | Carson | Aug. 10, 1915 |
| 1,436,961 | Johnson | Nov. 28, 1922 |
| 1,445,980 | Stout | Feb. 20, 1923 |
| 1,544,198 | Thornhill | June 30, 1925 |
| 1,835,474 | Witt | Dec. 8, 1931 |
| 1,896,876 | Wildmon | Feb. 7, 1933 |
| 2,363,127 | Grover | Nov. 21, 1944 |
| 2,441,768 | Jordan | May 18, 1948 |

FOREIGN PATENTS

| | | |
|---|---|---|
| 306,445 | Great Britain | Apr. 25, 1929 |